Inventor
Clayton L. Sonen
By Earl F. Pierce
Atty.

Patented Nov. 15, 1927.

1,649,139

UNITED STATES PATENT OFFICE.

CLAYTON L. SONEN, OF CHICAGO, ILLINOIS, ASSIGNOR TO THE BASSICK MANUFACTURING COMPANY, OF CHICAGO, ILLINOIS, A CORPORATION OF DELAWARE.

FLEXIBLE CONDUIT.

Application filed April 19, 1924. Serial No. 707,714.

My invention relates to improvements in flexible conduits, and is particularly concerned with the provision of a flexible conduit having a novel type of union or terminal secured thereto in a novel manner.

My invention is particularly concerned with improvements in that type of flexible conduit which is used for conveying fluids under high pressure, and is especially adapted to be used as a part of a lubricating system that supplies lubricant to bearings under high pressure. In such systems, coupling members of various types are used for connecting a high pressure compressor with the fittings which conduct the lubricant to the bearings. Considerable difficulty has heretofore been experienced in attaching the coupling members to the free end of the flexible conduit, which serves as a discharge conduit for the compressor, in such manner as to prevent the escape of lubricant through the connection between the flexible conduit and the coupling member.

The principal object of my invention is to provide a flexible conduit of the character described having a union or terminal secured to the free end thereof, to which a coupling member can be secured.

Another object of my invention is to provide a conduit having a terminal or union of the character described, which is simple in construction and economical to manufacture.

Other objects of my invention will appear as this description progresses, reference being had to the accompanying drawings, in which Figure 1 is a side elevation, partially in central longitudinal section, of my improved conduit;

Figure 1:
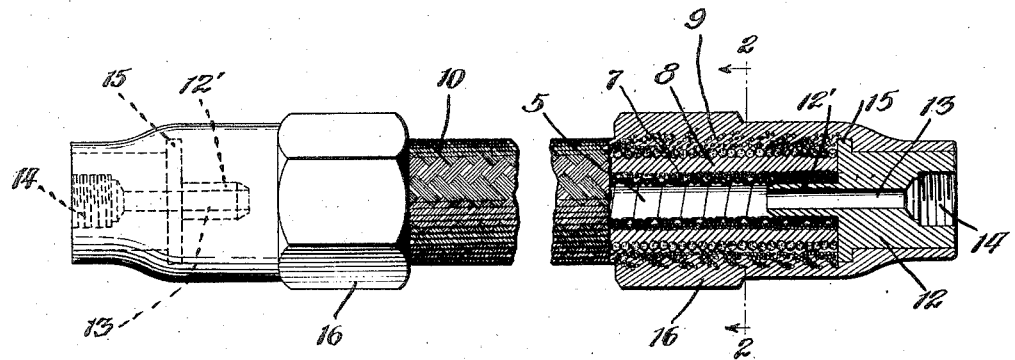
Figure 2:
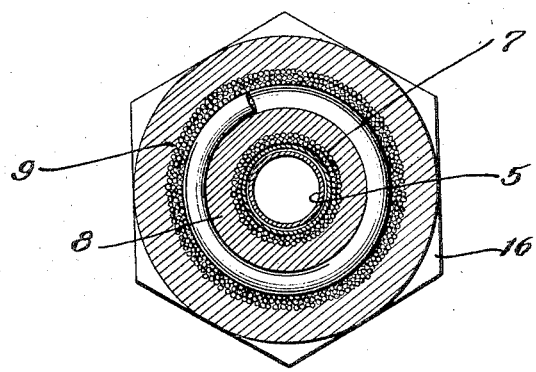
Figure 2 is a transverse section taken on line 2—2 of Figure 1.
Figure 3:
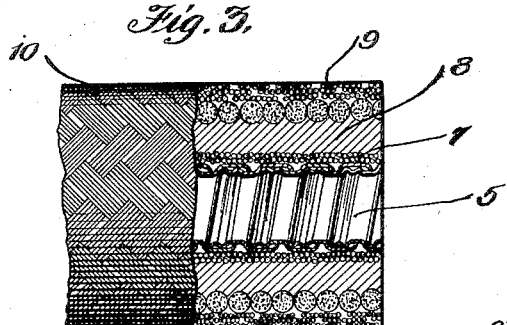
Figure 3 is an enlarged sectional detail of the end of a conduit as it appears before the terminal or union, forming a part of my invention, is attached thereto.

The flexible conduit forming a portion of my invention comprises a pair of overlapping and interlocking spiral strips 5, which are surrounded by a braided covering 7 of metallic wire. This covering is enclosed by a rubber sheath 8, around which is braided a fibre sheath 9, and the entire assembly just described is covered by an external braided wire sheathing 10. The particular construction of the flexible conduit just described forms no part of my present invention except as it coacts with the elements about to be described.

The coupling or terminal member which forms a part of my invention comprises the union 12, which has a tubular extension 12' extending into the flexible conduit formed by the spiral strips 5. The outer end of the bore 13 of the union 12 is threaded, as shown at 14, to permit the attachment of any suitable coupling member, or other desired device. The union 12 is also provided, adjacent its inner end, with an annular flange 15, which abuts against the end of the flexible conduit, and which forms a shoulder for locking engagement with the metal sleeve 16 that is die cast around the union 12 and the adjacent end portion of the conduit.

It will, of course, be understood that in the die casting process, by which the sleeve 16 is attached to the end of the conduit, the metal forming the sleeve is placed under pressure, thereby causing the metal, before it solidifies, to penetrate the interstices between the strands of the braided metal wire sheathing 10. As the metal cools, it shrinks to a certain extent, and thereby insures a tight and rigid connection between the union 12 and the conduit.

The tubular portion 12' of the union 12 fits rather snugly into the bore of the flexible conduit and prevents any of the metal, forming the sleeve 16, from flowing into the bore of the conduit during the die casting operation. The flange 15 provides a shoulder which is engaged by the metal of the sleeve 16, and which prevents the union 12 from being withdrawn from the sleeve 16.

The construction which I have just described is a simple one, economical to manufacture, and efficient in preventing the escape of lubricant between the union 12 and the conduit.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. The combination with a flexible conduit comprising a flexible metallic conduit, a rubher sheath surrounding said flexible conduit, and an external braided wire sheathing, of a coupling member comprising a union having a tubular portion extending into said metallic conduit, and contacting therewith, a flange extending to points adjacent the outside of said braided wire sheathing, and a sleeve die-cast around said union and embedding a portion of said braided wire sheathing adjacent said union.

2. The combination with a flexible conduit comprising a flexible metallic conduit, and an external braided wire sheathing, of a coupling member comprising a union having a tubular portion extending into said metallic conduit and contacting therewith, and a sleeve die-cast around said union and embedding a portion of said braided wire sheathing adjacent said union, said sleeve and union having interlocking portions for preventing said union from being withdrawn from said sleeve.

3. A permanently joined terminal for flexible tubing comprising a tubular element having a shoulder in abutment with the end of the tube, an extension on said element telescoped in the end of the tube, and a die cast sleeve embedding the outer tubing surface and the element in an integral matrix, said element and conduit having irregularities of contour on their outer surfaces to improve their bond with said sleeve.

In witness whereof, I hereunto subscribe my name this 16 day of April, 1924.

CLAYTON L. SONEN.